United States Patent [19]
Yamada et al.

[11] Patent Number: 4,802,160
[45] Date of Patent: Jan. 31, 1989

[54] OPTICAL DISK SUBSTRATE

[75] Inventors: Takashi Yamada; Masaaki Nomura; Ryoichi Yamamoto; Akira Nahara, all of Odawara, Japan

[73] Assignee: Fuji Photo Film Co., Ltd., Minami-ashigara, Japan

[21] Appl. No.: 104,271

[22] Filed: Oct. 5, 1987

[30] Foreign Application Priority Data

Oct. 6, 1986 [JP] Japan ................ 61-237729

[51] Int. Cl.$^4$ ............... G11B 7/24; G11B 7/00; G11B 25/04
[52] U.S. Cl. ............... 369/284; 369/272; 369/279; 369/286
[58] Field of Search ............ 369/274, 283, 284, 286, 369/272, 277

[56] References Cited

U.S. PATENT DOCUMENTS 4,710,913  12/1987  Matsushima et al. ............ 369/280
4,720,826   1/1988  Sugiyama et al. ............... 369/283

Primary Examiner—Steven L. Stephan
Attorney, Agent, or Firm—Gerald J. Ferguson, Jr.

[57] ABSTRACT

An optical disk substrate has a surface on which a pregroove for light beam tracking is formed. Non-pregrooved regions on the substrate surface on which the pregroove is formed are subjected to surface roughing processing to improve adhesion of the substrate surface in the non-pregrooved regions to a film which is to be overlaid on the optical disk substrate.

3 Claims, 1 Drawing Sheet

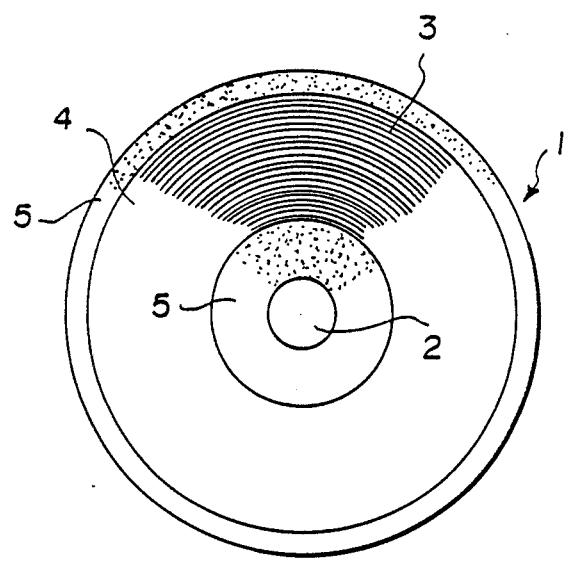

OPTICAL DISK SUBSTRATE

BACKGROUND OF THE INVENTION

1. Field of the Invention

This invention relates to an optical disk substrate having a surface on which a pre-groove for light beam tracking is formed.

2. Description of the Prior Art

Optical disks known as one kind of high-density recording media are used for recording of information thereon and/or reading of recorded information therefrom by use of a light beam. Various types of optical disks have heretofore been proposed, for example, a reproduction only type usable only for reading of the recorded information, a post-recording type in which recording is also possible, and an erasing/rewriting type (for example, a magneto-optical disk) in which erasing is also possible.

In general, the optical disk is composed of a substrate, and a thin film overlaid on the substrate and comprising a reflection layer, a base layer and/or a recording layer. Recording of information on the optical disk, reading of the recorded information from the optical disk, or erasing of the recorded information is carried out by moving a light beam along a recording track on the optical disk.

In the course of carrying out recording, reading or erasing on the optical disk, it is necessary to accurately guide the light beam onto the recording track formed in advance on the optical disk and to accurately move the light beam along the recording track. As one method of controlling the tracking of the light beam, a pre-groove method has heretofore been known.

In the pre-groove method, a spiral groove is formed in advance along the recording track on the surface of the optical disk substrate on the side provided with the aforesaid thin film, and light beam tracking is carried out based on the groove.

On the other hand, as mentioned above, the optical disk is composed of the substrate and the thin film overlaid of the substrate. In the case where adhesion between the substrate and the thin film is low, separation and cracking of the thin film and other problems arise.

Experiments on separation and cracking of the thin film and other problems revealed that, though adhesion between the substrate and the thin film is high in the region on the substrate where the pre-groove is formed and separation and cracking of the thin film and other problems do not so much arise in this region, adhesion is comparatively low in regions on the substrate where no pre-groove is formed, i.e. in the outer circumferential region and in the inner circumferential region of the substrate, and separation and cracking of the thin film and other problems readily arise in the non-pregrooved regions.

SUMMARY OF THE INVENTION

The primary object of the present invention is to provide an optical disk substrate provided with a pre-groove which exhibits good adhesion to a thin film substantially over the entire surface.

Another object of the present invention is to provide an optical disk substrate suitable for producing an optical disk having a high quality.

The present invention provides an optical disk substrate having a surface on which a pre-groove for light beam tracking is formed, wherein non-pre-grooved regions on said substrate surface on which said pre-groove is formed are subjected to surface roughing processing.

With the optical disk substrate in accordance with the present invention wherein the non-pre-grooved regions are subjected to surface roughing processing, adhesion between the substrate and the thin film is improved in the non-pre-grooved regions present at the outer circumferential portion and the inner circumferential portion of the substrate by the surface roughing processing. Also, since adhesion of the substrate in the non-pre-grooved regions to the thin film is improved, the problem with regard to the appearance, such as separation of the thin film, and cracking of the thin film caused by low adhesion as in the conventional optical disk substrate can be eliminated, and an optical disk having a high quality can be produced.

BRIEF DESCRIPTION OF THE DRAWING

The single drawing is a plan view showing an embodiment of the optical disk substrate in accordance with the present invention.

DESCRIPTION OF THE PREFERRED EMBODIMENTS

The present invention will hereinbelow be described in further detail with reference to the accompanying drawing.

In general, an optical disk substrate is formed of glass or a transparent plastic material such as PC or PMMA so that the thickness is approximately 1 mm. An optical disk substrate 1 shown in the accompanying drawing is formed of a transparent plastic material into a disk-like shape having an inner diameter of 15 mm and an outer diameter of 130 mm and having a center hole 2 at the center. Also, a pre-grooved region 4 and non-pre-grooved regions 5, 5 in which no pre-groove is formed are present on a surface of the optical disk substrate 1. In the pre-grooved region 4, a pre-groove 3 for light beam tracking is formed in a spiral shape or concentrically. The non-pre-grooved regions 5, 5 are present outward and inward of the pre-grooved region 4, i.e. at the outer circumferential portion and the inner circumferential portion of the optical disk substrate 1. The non-pre-grooved regions 5, 5 are subjected to surface roughing processing, forming many minute protrusions and recesses in the non-pre-grooved regions 5, 5 on the surface of the optical disk substrate 1. The pre-grooved region 4 corresponds to the recording region, and the non-pre-grooved regions 5, 5 correspond to the non-recording regions.

Though surface roughing processing may be carried out over the entire area of the non-pre-grooved regions 5, 5, it does not have to be carried out over the entire area. In the embodiment shown, surface roughing processing is carried out over an area ranging from between a circle having a 17 mm diameter and a circle having a 44 mm diameter in the inner circumferential non-pre-grooved region 5 to an area ranging from a circle having a 15 mm diameter to a circle having a 45 mm diameter, and over an area ranging from between a circle having a 123 mm diameter and a circle having a 128 mm diameter an area ranging from a circle having a 120 mm diameter to a circle having a 130 mm diameter.

Surface roughing processing may be carried out in any manner insofar as many minute protrusions and recesses having appropriate sizes are formed on the surface of the optical disk substrate 1. The heights of the minute protrusions or the depths of the minute recesses should preferably be within the range of approximately 0.05μ to approximately 5μ.

As one method of forming minute protrusions or recesses by surface roughing processing in the non-pre-grooved regions 5, 5, minute protrusions or recesses may be formed on a stamper for injection molding and transferred to the optical disk substrate in the course of the formation of the optical disk substrate. The formation of minute protrusions or recesses on the stamper may be carried out by, for example, roughing the surface of a master glass plate to form minute protrusions or recesses thereon, and transferring the minute protrusions or recesses from the master glass plate to the stamper. Specifically, surface regions of the master glass plate corresponding to the non-pre-grooved regions 5, 5 are roughed by matting or the like, and the stamper is formed by use of the master glass plate. In this manner, the minute protrusions or recesses formed by surface roughing processing are transferred to the stamper. The optical disk substrate is formed of a plastic resin by injection molding using the stamper, and the minute protrusions or recesses are thus transferred to the optical disk substrate.

Roughing of the surface regions of the master glass plate corresponding to the non-pre-grooved regions 5, 5 may be carried out by, for example, a physical method wherein an abrasive material such as sand is used, the glass surface being roughened by sandblasting by use of compressed air or by grinding with the sand or with a grinding wheel having a comparatively large grain size, or by a chemical method that utilizes etching with hydrogen fluoride.

As another example of the method of forming the minute protrusions or recesses by surface roughing processing on the non-pre-grooved regions 5, 5, surface roughing processing may be carried out directly on the optical disk substrate formed of a plastic material. In this case, for example, the pr--grooved region 4 is masked, and the minute protrusions or recesses are formed in the non-pre-grooved regions 5, 5 by plasma etching in a vacuum vessel prior to the formation of the thin film.

Then, the optical disk is obtained by overlaying the thin film composed of a reflection layer, a base layer, a recording layer and/or a protective layer by sputtering, vapor evaporation or the like on the surface of the optical disk substrate 1 on which the pre-groove is formed in the pre-grooved region 4 and the minute protrusions or recesses are formed by surface roughing processing in the non-pre-grooved regions 5, 5 in the manner as mentioned above.

Adhesion of the thin film overlaid on the substrate surface in the non-pre-grooved regions to the optical disk substrate was investigated in terms of the degree of occurrence of cracking by carrying out accelerated tests on the optical disk comprised of the optical disk substrate 1 in accordance with the aforesaid embodiment and the thin film overlaid on the optical disk substrate 1, and an optical disk comprised of a conventional optical disk substrate and a thin film overlaid thereon. In the accelerated test on the optical disk using the conventional optical disk substrate, cracking occurred after a testing time of 100 hours at a temperature of 60° C. and humidity of 90%. In the accelerated test on the optical disk using the optical disk substrate of the aforesaid embodiment in accordance with the present invention, no cracking occurred under the same conditions. Thus it was found that the optical disk substrate of the aforesaid embodiment in accordance with the present invention exhibits excellent adhesion to the thin film also in the non-pre-grooved regions 5, 5.

We claim:

1. An optical disk substrate having a surface on which an annular pre-groove is disposed for light beam tracking and further surfaces on which first and second annular non-pre-grooved regions are respectively disposed outside and inside the annular pre-groove wherein at least one of said first and second annular non-pre-grooved regions extends to the pre-groove and wherein the entirety of the first and second annular non-pre-grooved regions are subjected to surface roughing processing.

2. An optical disk substrate as defined in claim 1 wherein minute protrusions or recesses having heights or depths within the range of approximately 0.05μ to approximately 5μ are formed by said surfaces roughing processing in said non-pre-grooved regions.

3. An optical disk substrate as defined in claim 1 wherein both said first and second annular non-pre-grooved regions respectively extend to the outer and inner circumferential edges of the pre-groove.

* * * * *